(12) United States Patent
Lindahl et al.

(10) Patent No.: US 7,591,431 B2
(45) Date of Patent: Sep. 22, 2009

(54) TRANSACTION CARD WITH BEADS

(75) Inventors: Kim O. Lindahl, Golden Valley, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 271 days.

(21) Appl. No.: 11/697,462

(22) Filed: Apr. 6, 2007

(65) Prior Publication Data
US 2008/0245858 A1 Oct. 9, 2008

(51) Int. Cl.
*G06K 19/00* (2006.01)

(52) U.S. Cl. .................. 235/487; 235/375; 235/380; 235/381; 235/383

(58) Field of Classification Search ............ 235/375, 235/380, 381, 382, 487
See application file for complete search history.

(56) References Cited

U.S. PATENT DOCUMENTS

| | | | |
|---|---|---|---|
| 1,580,921 A | | 4/1926 | Scherer |
| 2,827,720 A | | 3/1958 | Phillippi |
| D280,214 S | | 8/1985 | Opel |
| 5,292,255 A | * | 3/1994 | Goldwasser .................. 434/84 |
| 5,407,711 A | | 4/1995 | Lovison et al. |
| 5,450,190 A | | 9/1995 | Schwartz et al. |
| 5,585,189 A | * | 12/1996 | Inoue et al. .................. 428/461 |
| 5,695,346 A | * | 12/1997 | Sekiguchi et al. ........... 434/365 |
| 5,741,578 A | * | 4/1998 | Sax .............................. 428/212 |
| 5,837,367 A | | 11/1998 | Ortiz, Jr. et al. |
| D447,515 S | | 9/2001 | Faenza, Jr. et al. |
| D449,336 S | | 10/2001 | Webb et al. |
| 6,296,188 B1 | | 10/2001 | Kiekhaefer |
| D486,179 S | | 2/2004 | True |
| 6,860,927 B2 | | 3/2005 | Kuntz et al. |
| 7,004,398 B1 | | 2/2006 | Francis et al. |
| 7,048,307 B1 | | 5/2006 | Scarbrough et al. |
| D554,643 S | | 11/2007 | McCarty et al. |
| 2002/0143697 A1 | | 10/2002 | Gotfried |
| 2003/0062716 A1 | * | 4/2003 | Curiel .......................... 283/71 |
| 2004/0096601 A1 | * | 5/2004 | Raymond ................... 428/34.1 |
| 2006/0029753 A1 | | 2/2006 | Kuo et al. |
| 2006/0292946 A1 | | 12/2006 | Kiekhaefer |
| 2007/0252009 A1 | * | 11/2007 | Kingsborough et al. ..... 235/487 |

OTHER PUBLICATIONS

"Travel Tags Cards For Every Customer," www.traveltags.com/RaisedTexturedSurface.html?TID=6, printed on Mar. 19, 2007.
Rudd, David, "A Touch of Gold: Trading Cards and the Ancient Art of Gilding," www.cycleback.com/gild.htm, available at least as early as Aug. 11, 2002 per the Internet Archive available at www.archive.org (3 pages).

* cited by examiner

*Primary Examiner*—Thien M. Le
*Assistant Examiner*—Tuyen K Vo
(74) *Attorney, Agent, or Firm*—Griffiths & Seaton PLLC

(57) ABSTRACT

A transaction card includes a substrate, a plurality of adhesive dots, and a plurality of beads. The substrate includes an account identifier linking the transaction card to at least one of an account and a record, and the account identifier is machine readable by a point-of-sale terminal. The plurality of adhesive dots is applied to a surface of the substrate. The plurality of beads are each individually secured to the surface of the substrate with a separate one of the plurality of adhesive dots. Stored-value card assemblies, methods of encouraging purchase and facilitating use of a stored-value card, and other embodiments are also disclosed.

21 Claims, 9 Drawing Sheets

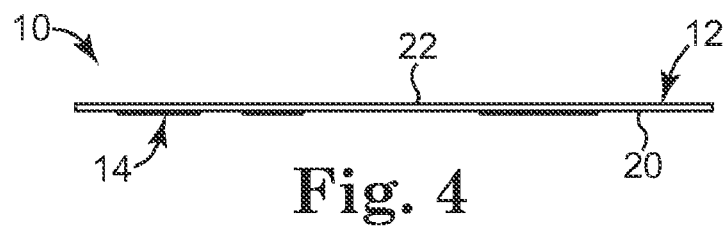
Fig. 4
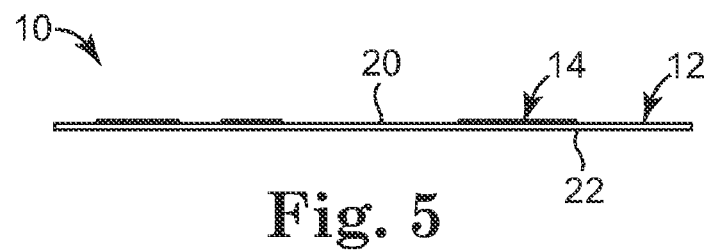
Fig. 5
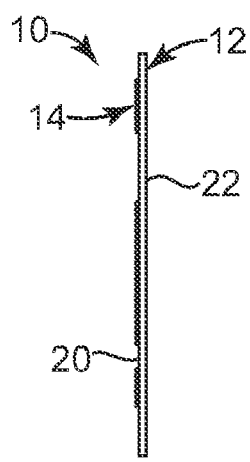 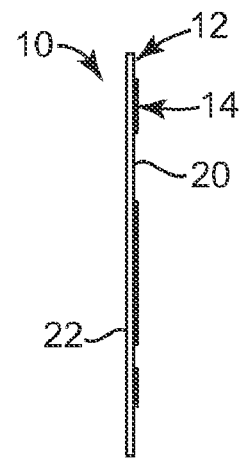
Fig. 6  Fig. 7
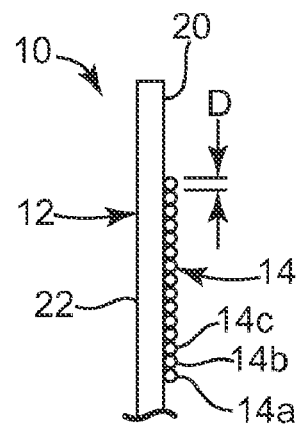
Fig. 8

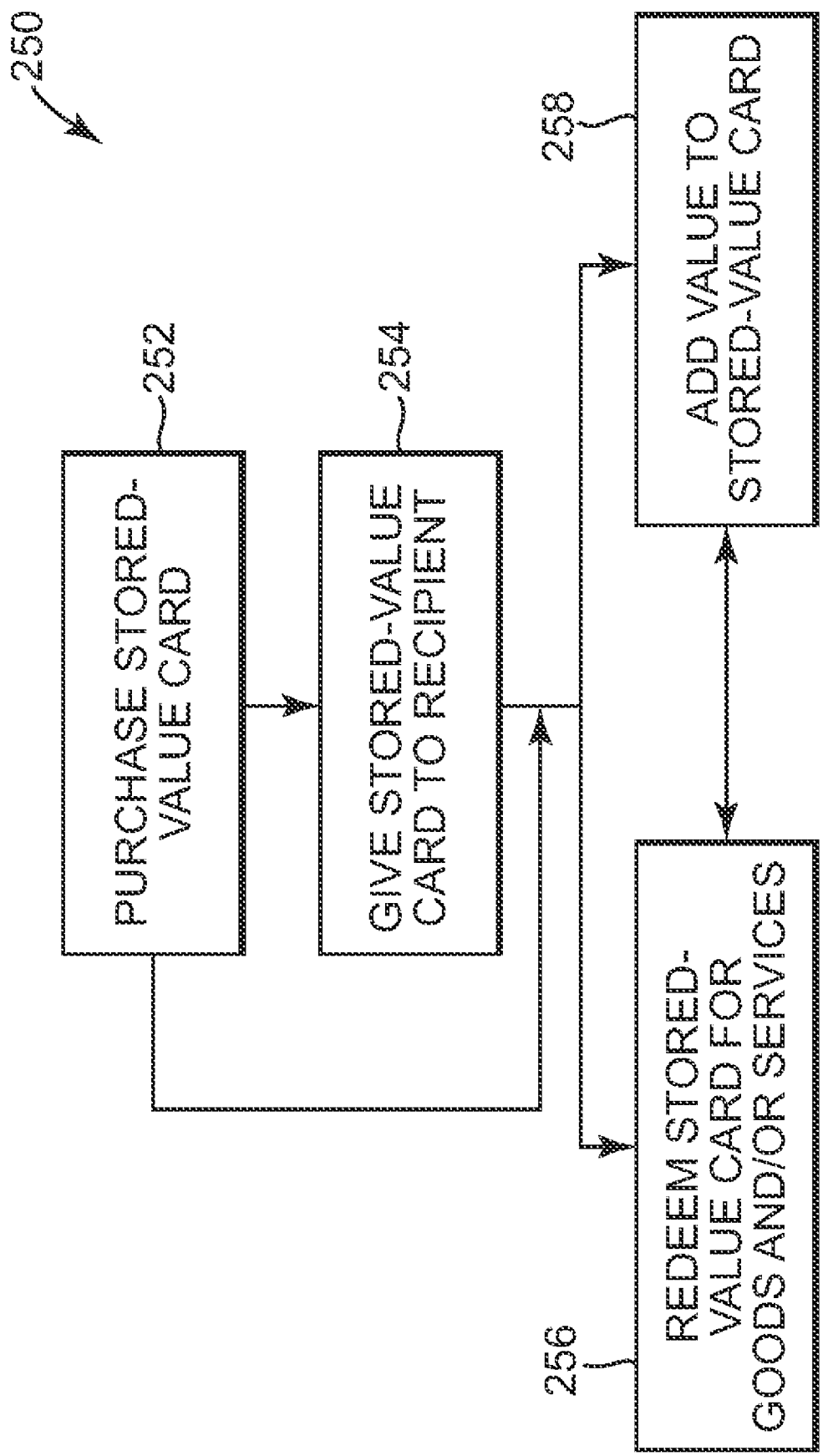

TRANSACTION CARD WITH BEADS

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a transaction card including a substrate, a plurality of adhesive dots, and a plurality of beads. The substrate includes an account identifier linking the transaction card to at least one of an account and a record, and the account identifier is machine readable by a point-of-sale terminal. The plurality of adhesive dots are applied to a surface of the substrate. The plurality of beads are each individually secured to the surface of the substrate with a separate one of the plurality of adhesive dots. Methods of providing a stored-value card, and other embodiments of stored-value or financial transaction cards and associated assemblies are also disclosed.

BRIEF DESCRIPTION OF THE DRAWINGS

Embodiments of the invention will be described with respect to the figures, in which like reference numerals denote like elements, and in which:

FIG. 4 is a top view illustration of the stored-value card of FIG. 1.

FIG. 5 is a bottom view illustration of the stored-value card of FIG. 1.

FIG. 6 is a right side view illustration of the stored-value card of FIG. 1.

FIG. 7 is a left side view illustration of the stored-value card of FIG. 1.

FIG. 8 is a detailed left side view illustration of a portion of the stored-value card of FIG. 1, according to one embodiment of the present invention.

FIG. 14 is a flow chart illustrating a method of using a stored-value card, according to one embodiment of the present invention.

DETAILED DESCRIPTION

Figure 1:
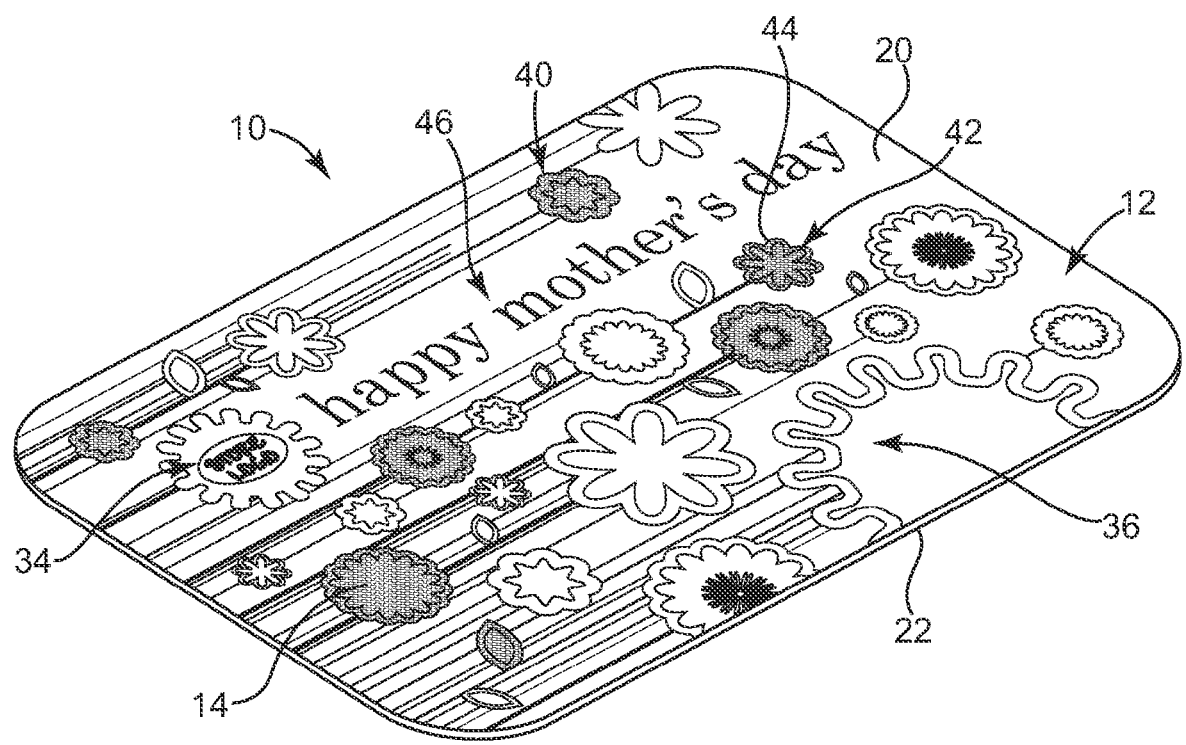
FIG. 1 is a perspective view illustration of a stored-value card, according to one embodiment of the present invention.
Figure 2:
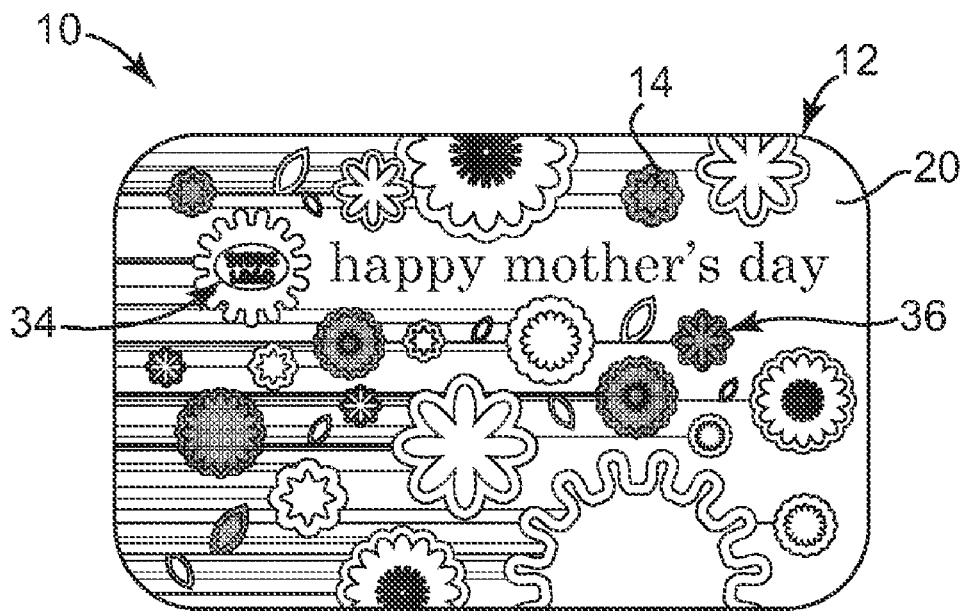
FIG. 2 is a front view illustration of the stored-value card of FIG. 1.

A stored-value card or financial transaction product, such as a gift card, is adapted for making purchases of goods and/or services at, for example, a retail store or web site. According to one embodiment, an original consumer buys a stored-value card to give a recipient who in turn is able to use it to pay for goods and/or services. A stored-value card, according to embodiments of the present invention, provides the consumer and/or recipient with a textured and aesthetically pleasing stored-value card.

Stored-value cards according to embodiments of the present invention are provided with opaque, translucent, and/or transparent beads attached to a surface thereof. For example, glass beads are applied to a surface of the stored-value card that was previously printed with graphics or other decorations. In one embodiment, the beads are each translucent or transparent such that the printed graphics can be viewed through the beads. In such an embodiment, beads may be configured to magnify, diffuse, or otherwise alter viewing of the printed graphics as desired. In one example, each bead is individually adhered to the surface of the stored-value card. Beads may be applied to the stored-value card in groupings or clusters to achieve a desired texture or other aesthetically pleasing effect.

Turning to the figures, FIGS. 1-8 illustrate various views of one embodiment of a financial or stored-value product or card 10 including a substrate 12 and a plurality of beads 14 coupled thereto. Substrate 12 is any suitable material such as a somewhat rigid yet flexible material similar to that commonly used for identification cards, credit cards, etc. More specifically, in one embodiment, substrate 12 is a substantially planar member formed of paper, cardstock, plastic (e.g. polycarbonate, polystyrene, polyvinyl chloride (PVC), acrylonitrile butadiene styrene (ABS)), or other suitable material. In one embodiment, substrate 12 is formed of injection molded plastic or cut from sheet-stock plastic material. Substrate 12 can be formed in any other suitable planar or non-planar configuration as will be apparent to those of skill in the art upon reading this application.

In one embodiment, substrate 12 defines a first surface 20 (i.e., a first major surface) and a second surface 22 (i.e., a second major surface) opposite first surface 20 separated by a thickness of stored-value card 10. In one embodiment, at least one of first and second surfaces 20 and 22 is substantially planar. In one embodiment, substrate 12 is, substantially rectangular in shape, and, in one example, is similarly sized to an identification card, a credit card, or other card sized to fit in a wallet of a card bearer (i.e. are wallet sized). Accordingly, in one example each of first and second surfaces 20 and 22 are substantially rectangular and/or otherwise wallet sized. In particular, in one embodiment, the overall dimensions of substrate 12 are about 8.5 cm by about 5.5 cm wide with a thickness of less than about 1 mm. In other embodiments, substrate 12 is otherwise shaped as a square, circle, oval, star, or any other suitable shape.

Figure 3:
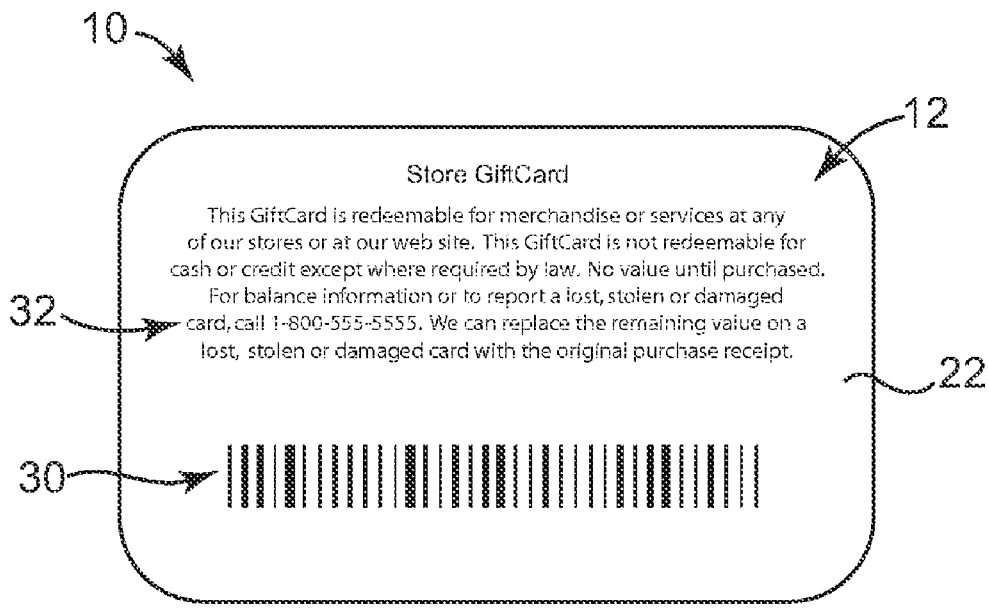
FIG. 3 is a rear view illustration of the stored-value card of FIG. 1.

Referring to the rear view illustration of FIG. 3, stored-value card 10, for example, second surface 22 of substrate 12, includes at least one account activation area or account identifier 30, such as a bar code, a magnetic strip, a smart chip or other electronic device, a radio frequency identification (RFID) device, or other suitable identifier readily machine readable by a point-of-sale terminal, account access station, kiosk, or other suitable device. In one embodiment where account identifier 30 is machine readable, account identifier 30 is also readable by a bearer of stored-value card 10 such that stored-value card 10 can be used when a machine configured to read stored-value card 10 is not present (e.g., when using stored-value card 10 to make a purchase on a web site). More particularly, in one embodiment, account identifier 30 is printed on or otherwise applied to second surface 22 of substrate 12.

Account identifier 30 indicates a financial or other stored-value account or record to which stored-value card 10 is linked. The account or record of the monetary, points, minutes, or other balance associated with stored-value card 10 optionally is maintained on a database, other electronic or manual record-keeping system, or, in the case of "smart" cards for example, on a chip or other electronic device on/in stored-value card 10 itself. Accordingly, by scanning account identifier 30, the account or record linked to stored-value card 10 is identified and can subsequently be activated, have amounts debited therefrom, and/or have amounts credited thereto. Account identifier 30 is one example of means for linking stored-value card 10 with an account or record.

In one embodiment, redemption indicia 32 are included on stored-value card 10 such as on second surface 22 of substrate 12. Redemption indicia 32 indicate that stored-value card 10 is redeemable for the purchase of goods and/or services and that, upon use, a value of the purchased goods and/or services will be deducted from the account or record linked to stored-value card 10. In one embodiment, redemption indicia 32 include phrases such as "<NAME OF STORE>GiftCard" and "This GiftCard is redeemable for merchandise or services at any of our stores or at our web site," and/or provides help or phone line information in the case of a lost, stolen, or damaged stored-value card, etc.

In one embodiment, stored-value card 10 includes other indicia disposed on stored-value card 10 such as, for example, brand indicia 34 and object or decorative indicia 36. Brand indicia 34 include, a logo, text, trademark, etc. that associates stored-value card 10 with at least one of a product, a brand, a store, etc. Decorative indicia 36 include any item (e.g., graphics or text) depicting or relating to, for example, any one or more of a holiday, a season, an occasion, a media format, e.g. characters, logos, scenes, or other illustrations or photographs related to at least one of a movie, television show, book, video game, etc. In one embodiment, decorative indicia 36 are formed on substrate 12 in a solid printing process as opposed to a dot format process. Other indicia or additional features may also be included on stored-value card 10 as will be apparent to those of skill in the art upon reading this application. In one example, any one or more of indicia 32, 34, and 36 may not be included on stored-value card 10.

Beads 14 are any suitable three-dimensional object configured to be coupled to first surface 20 of substrate 12 to provide texture to substrate 12 and/or to provide an aesthetically pleasing appearance. Beads 14 may be any substantially solid particle or relatively small object in any suitable shape, such as a round, cubic, pyramidal, or other suitable shape. In one example, each of beads 14 has a similar shape (e.g., each of beads is round, etc.). In one embodiment, beads 14 are one of opaque, translucent, and transparent. For example, beads 14 are formed of glass.

Referring to the detailed view of FIG. 8, in one example, beads 14 are formed of a suitable diameter D such that each of beads 14 is discernable to the naked eye of a card bearer as being a separate one of beads 14. For instance, in one embodiment, each bead 14 has a diameter D of greater than about 0.5 mm, for example, a diameter D between about 0.6 mm and about 1.0 mm. In this manner, beads 14 are characterized as appearing as individual beads and not appearing as a flat layer of material to a bearer of stored-value card 10.

In one embodiment, each of beads 14 is applied to substrate 12, more particularly, to first surface 20 thereof, in any suitable configuration. In one example, beads 14 are applied to first surface 20 in groupings or clusters 40 corresponding to decorative indicia 36. For instance, additionally referring to FIG. 1, where decorative indicia 36 depict closed boundary objects such as flowers 42, clusters 40 of beads 14 may be applied within boundaries 44 of each flower 42 or to otherwise correspond with decorative indicia 36 while other portions 46 of first surface 20 of substrate 12 do not include beads 14, thereby providing areas of relief on stored-value card 10. As such, each of the clusters 40 of beads 14 are spaced from one another on first surface 20. In one embodiment, beads 14 included in clusters 40 are each applied to abut an adjacent one or more of beads 14 as generally indicated for individual beads 14a, 14b, and 14c in FIG. 8. Also, as indicated in FIGS. 4-8, in one example, beads 14 are applied to first surface 20 in a single layer (i.e., are not stacked on one another).

Figure 9:
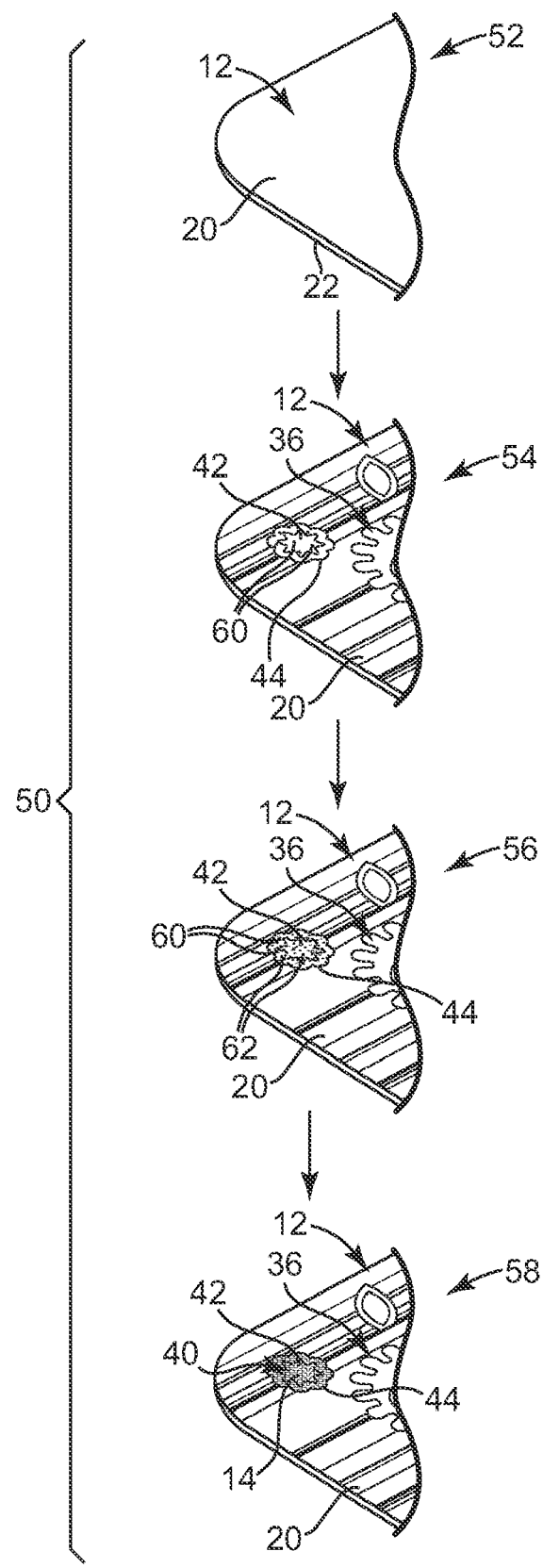
FIG. 9 is a schematic illustration of a method of coupling beads to a substrate of a stored-value card, according to one embodiment of the present invention.

In one embodiment, beads 14 are applied to substrate 12 in a spot printing method or by being silk screen printed directly to substrate 12. For example, FIG. 9 schematically illustrates a method of spot printing beads 14 onto substrate 12 generally at 50. More specifically, at 52, substrate 12 is provided. In one embodiment, substrate 12 is formed of PVC or ABS material and is characterized by an absence of varnish, polish, and/or film lamination to encourage proper registration and application of beads 14 thereto as will be further described below.

At 54, decorative indicia 36 or other indicia are printed to at least first surface 20 of stored-value card 10. In one embodiment, decorative indicia 36 are applied in a solid color printing method as opposed to a dot pattern printing since dot pattern printing may cause the image to blur when magnified through beads 14 as will be further described below. In one example, process or dot pattern printing may be used to encourage a desired blur of decorative indicia 36 or to form any other suitable effect when viewed through beads 14. In one embodiment, printing decorative indicia 36 includes printing substantially closed objects 42, such as flowers, on first surface 20 and/or printing randomly placed, small, colored dots 60 on first surface 20. Colored dots 60 are configured to give the visual effect of one or more beads 14 being colored (e.g., when beads 14 are actually transparent) when colored dots 60 are magnified therethrough, thereby enhancing the aesthetic appearance of stored-value card 10.

In a spot printing process, for example, at operation 56 of method 50, adhesive spots 62 are applied to substrate 12 using a spot printing process to precisely position each of adhesive spots 62 in a desired position on substrate 12, such as in clusters 40 within corresponding boundaries of 44 and over each of objects 42. In one embodiment, an adhesive is used to form adhesive spots 62 is one of translucent and transparent to decrease undesired distortion of decorative indicia 36 viewed therethrough. In one example, a suitable adhesive or glue used to form adhesive spots 62 is configured for use with the particular material forming substrate 12, the material of beads 14, and/or the diameter D of each of beads 14. More specifically, each of adhesive spots 62 is configured to receive and maintain a bead 14. In one embodiment, the adhesive of adhesive spots 62 is configured to be cured at a low temperature such as, for example, a temperature less than about 75° C. (e.g., at a temperature of about 50° C.). In one example, adhesive spots 62 are formed on first surface 20 of substrate 12 where first surface 20 is characterized as not being polished, film laminated, or varnished.

After adhesive spots 62 have been applied to substrate 12, then, at 58, one of beads 14 is applied to each adhesive spots 62 using any suitable method, as will be apparent to those of skill in the art, such that beads 14 are coupled to substrate 12 on a one-to-one ratio with adhesive spots 62 previously applied to substrate 12. In one embodiment, by using substrate 12 formed of a material that is not polished, film laminated, or varnished, the chance for mis-registration or mis-alignment of each bead 14 with a corresponding adhesive spot 62 is decreased.

Once beads 14 are all suitably positioned, adhesive spots 62 are cured. In one example, adhesive spots 62 are cured by heating stored-value card 10 with a low temperature heat source, for example a heat source having a temperature of less than about 75° C., for an extended period of time (e.g., about 15, 20, or more minutes). Heating at the low temperature for the extended period of time is configured to prevent or at least decrease warping or other deformation of substrate 12 during curing. Other methods of applying beads 14 to substrate 12 will be apparent to those of skill in the art upon reading this application. For example, where substrate 12 is a flexible material (e.g., fabric), beads 14 may be laminated to a translucent film material (not shown) such as polyethylene terephthalate (PET) with a spot printed adhesive and the laminated translucent film material may subsequently be laminated to the flexible material using a heat transfer process.

Once adhesive spots 62 are cured, adhesive spots 62 are translucent or transparent, and since, in one embodiment, beads 14 are translucent or transparent, decorative indicia 36 and/or front surface 20 of substrate 12 can be viewed through beads 14 and adhesive spots 62. In one example, beads 14 act as a one of a magnifier and a diffuser to create a desired visual effect in addition to a textured first surface 20.

Figure 10:
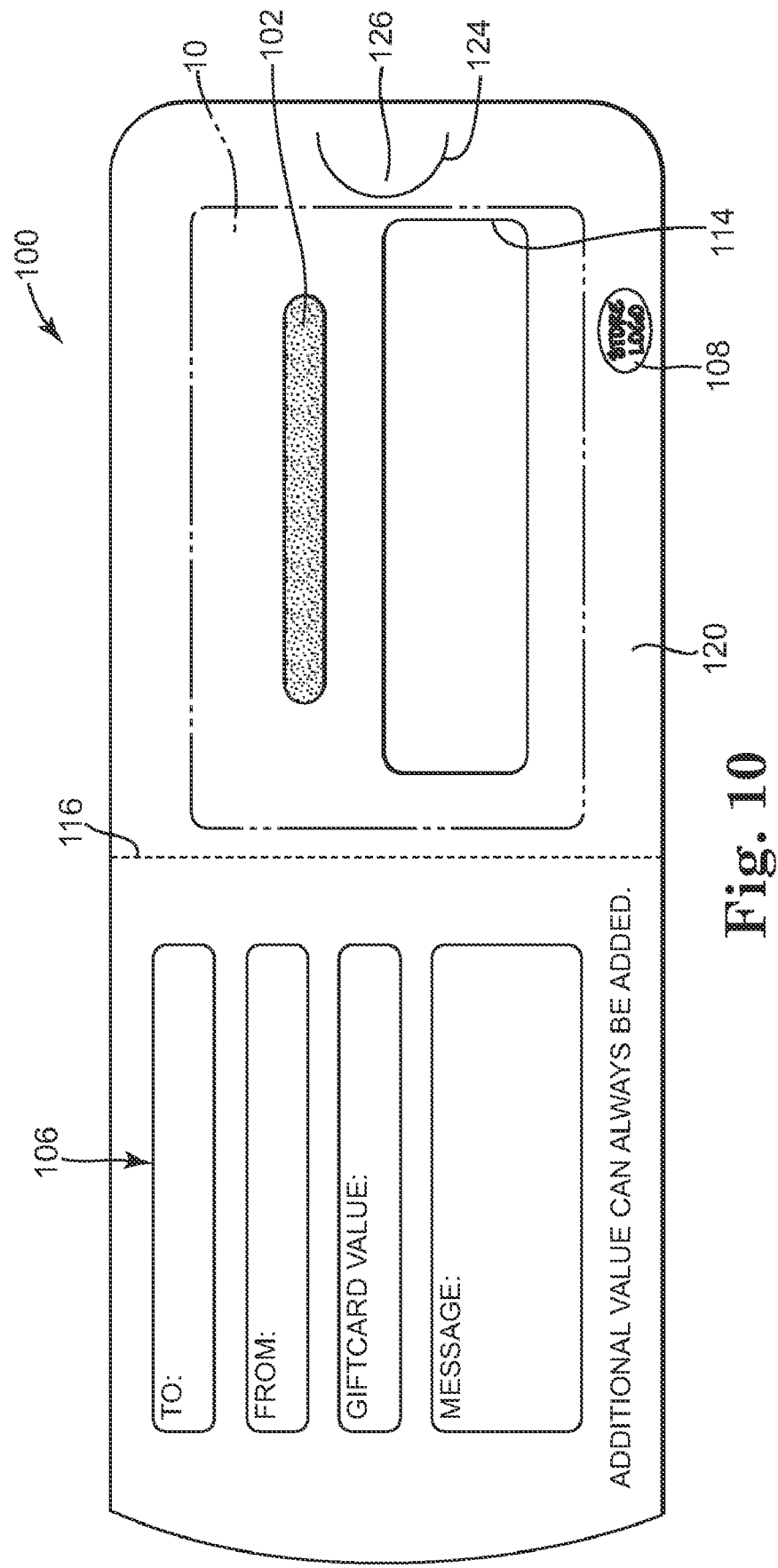
FIG. 10 is a front view illustration of a backer, according to one embodiment of the present invention.
Figure 11:
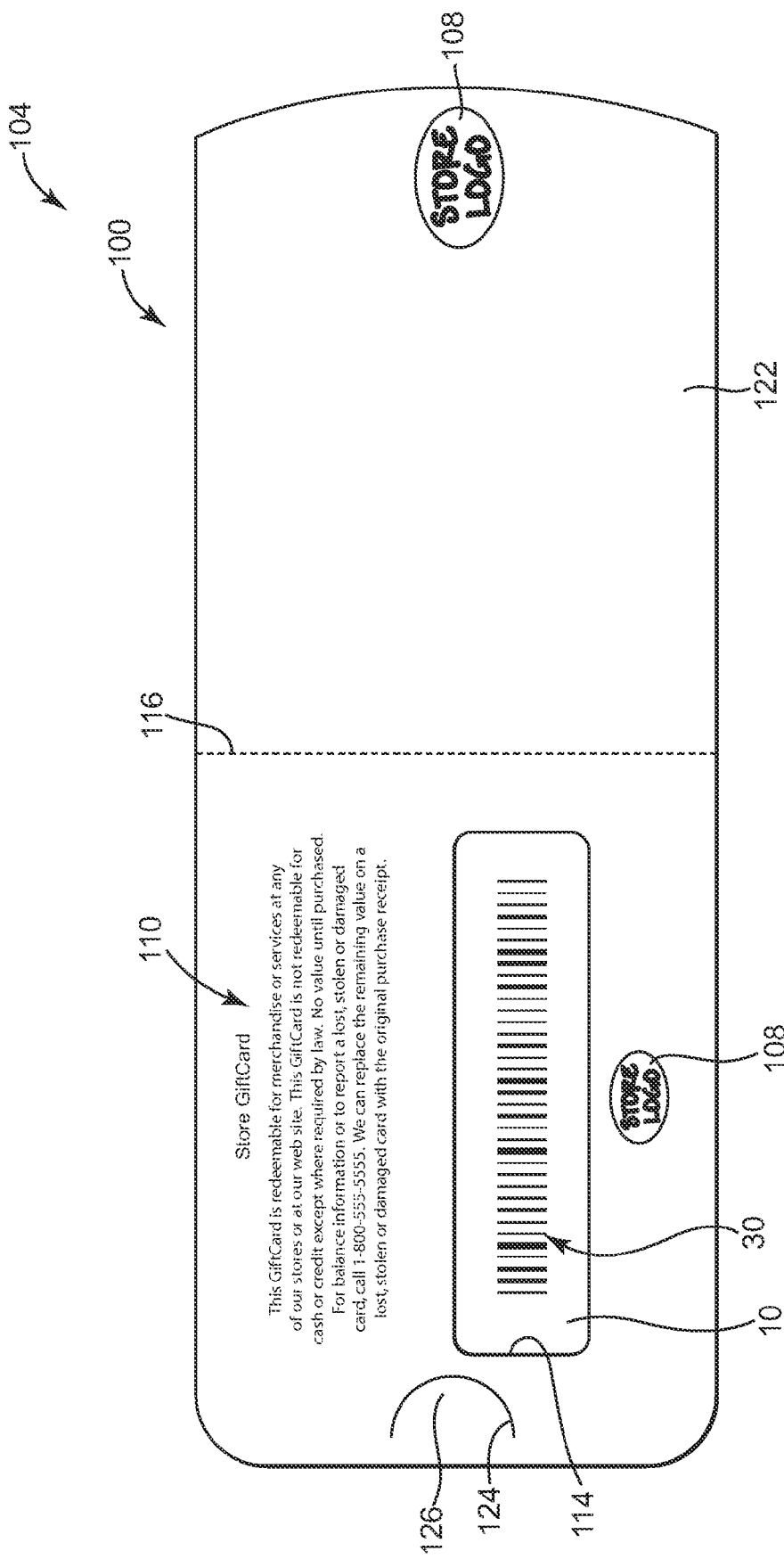
FIG. 11 is a rear view illustration of a stored-value card assembly including the backer of FIG. 10 and the stored-value card of FIG. 1, according to one embodiment of the present invention.

FIGS. 10 and 11 illustrate a carrier or backer 100 for supporting stored-value card 10. Stored-value card 10, which is represented in phantom lines in FIG. 10 for illustrative purposes so as to not obstruct backer 100, is readily releasably attached to backer 100, for example by a removable adhesive 102, an overlying skinning material, or the like. Backer 100 and stored-value card 10 collectively define a stored-value card assembly 104 (FIG. 11). Backer 100 comprises a single layer or multiple layers of paper or plastic material, for example, generally in the form of a relatively stiff but bendable/flexible card. Use of other materials is also contemplated. Backer 100 displays indicia, graphics or text information including store logo(s), store name(s), slogans, advertising, instructions, directions, brand indicia, promotional information, holiday indicia, seasonal indicia, media format identifiers, characters, and/or other information.

For example, indicia 106 include "to," "from," "amount," and "message" fields. The fields of indicia 106 provide areas of backer 100 configured to be written upon by a consumer to personalize backer 100 for presentation as a gift to a particular recipient, for a particular purpose, and/or to indicate a value of stored-value card 10. In one embodiment, stored-value card 10 includes brand indicia 108, which identifies a store, brand, department, etc. and/or services associated with stored-value card 10.

Referring to FIG. 11, in one embodiment, stored-value card 10 includes indicia 110 indicating that stored-value card 10 is redeemable for the purchase of goods and/or services and that upon use, a value of the purchased goods and/or services will be deducted from the financial account or record linked to stored-value card 10. In one embodiment, indicia 110 include phrases such as "<NAME OF STORE>GiftCard" and "This GiftCard is redeemable for merchandise or services at any of our stores or at our web site," and/or provides help or phone line information in case of a lost, stolen, or damaged stored-value card 10, etc.

Any of indicia 32, 34, 36, 106, 108, 110, or other indicia optionally may appear anywhere on backer 100 or stored-value card 10. Additional information besides that specifically described and illustrated herein may also be included and/or one or more of indicia 32, 34, 36, 106, 108, and 110 may be eliminated.

In one embodiment, backer 100 includes a window or opening 114 for displaying account identifier 30 of stored-value card 10 therethrough as illustrated in FIG. 11. As previously described, account identifier 30 is adapted for accessing an account or a record associated with stored-value card 10 for activating, loading value to, or debiting value from the account or record. Accordingly, opening 114 allows viewing or other access to account identifier 30 to activate and/or load stored-value card 10 without removing stored-value card 10 from backer 100. In one embodiment, a portion of backer 100 alternatively is configured to be folded away from the remainder of backer 100 to access account identifier 30 without removing stored-value card 10 from backer 100.

In one embodiment, backer 100 is a bi-fold substrate defining a fold line 116, about which backer 100 is foldable roughly in half. In FIGS. 10 and 11, backer 100 is unfolded, i.e. is in an open configuration. According to one embodiment, FIG. 10 illustrates inside surfaces 120 of backer 100 that will be supported on a rack or other fixture to be visible to a consumer of a retail store who is considering the purchase of stored-value card 10. In another example, while on display in a retail store, backer 100 is folded back about fold line 116 to present only portions of inside surfaces 120 of backer 100 (i.e., the surfaces illustrated in FIG. 10) that are positioned on the same side of fold line 116 as stored-value card 10 to a consumer. In such an embodiment, indicia 106 would not be visible to a consumer when backer 100 and stored-value card 10 are placed for display in a retail store. Backer 100 is one example of means for supporting stored-value card 10 for display in a retail setting.

After purchase, backer 100 is foldable about fold line 116 such that inside surfaces 120 (FIG. 10) of backer 100 are folded toward each other and stored-value card 10 is enclosed or wrapped in a compact package formed by foldable backer 100. In this manner, outside surfaces 122 (FIG. 11) of backer 100 are disposed toward the outside of the folded, compact package, according to embodiments of the invention. In one embodiment, folded backer 100 effectively wraps stored-value card 10 for presentation from a consumer to a recipient. Folding backer 100 in the other direction about fold line 116 for display on a rack in a retail setting, or about other fold lines of backer 100 is also contemplated. In one embodiment, although described above and depicted in FIGS. 10 and 11 as a single fold line 116, fold line 116 may be one of a plurality of fold lines (not shown) so as to accommodate various thickness of or to otherwise wrap stored-value card 10 as will be apparent to those of skill in the art upon reading this application.

In one embodiment, a cut 124 is formed through backer 100 near an edge of backer 100 that is spaced from and substantially parallel to fold line 116. Cut 124 extends partially toward fold line 116 with an arcuate shape and defines a flap 126, which can be partially bent away from the remainder of backer 100. More specifically, upon folding backer 100 about fold line 116 to close backer 100 around stored-value card 10, an opposing edge of backer 100 is tucked beneath flap 126 to maintain backer 100 in a folded or closed position. In one embodiment, cut 124 and thereby flap 126 are each substantially semi-circular in shape. Other backers similar to backer 100 can be used having various sizes and shapes for supporting stored-value card 10.

Figure 12:
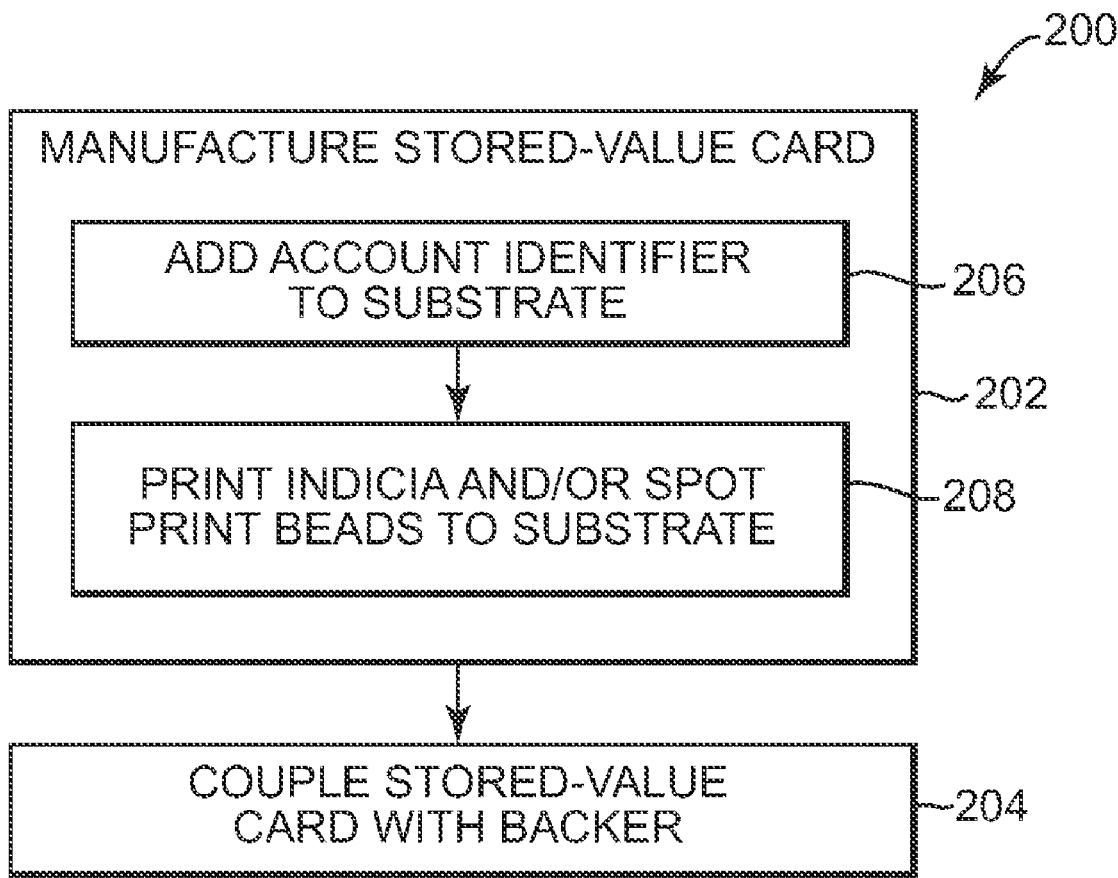
FIG. 12 is flow chart illustrating a method of assembling a stored-value card, according to one embodiment of the present invention.

FIG. 12 generally illustrates one embodiment of a method 200 of assembling stored-value card assembly 104 (FIG. 11) including manufacturing stored-value card 10 at 202. More specifically, at 206, account identifier 30 is added to substrate 12. For example, where account identifier 30 is a bar code, substrate 12 is printed with bar code; however, other methods of adding account identifier 30 to substrate 12 will be apparent to those of ordinary skill in the art, for example, an RFID device may be adhered or otherwise secured to substrate 12, etc. At 208, decorative indicia 36 or other indicia are printed to substrate 12, for example, first surface 20 in a similar manner as described above with respect to operation 54 (FIG. 9) or in any other suitable manner. Also at 208, beads 14 are printed to substrate 12 as described above with respect to operations 56 and 58 (FIG. 9) or in any other suitable method. As such, stored-value card 10 is provided with an aesthetically pleasing look and provides first surface 20 with relief or texture.

Once stored-value card 10 is manufactured at 202, then at 204 stored-value card 10 is coupled with backer 100. For example, stored-value card 10 is adhered or otherwise selectively coupled with backer 100, more specifically, with first surface 20 of substrate 12, as will be apparent to one of skill in the art beyond reading this application, to form stored-value card assembly 104 (FIG. 11).

Figure 13:
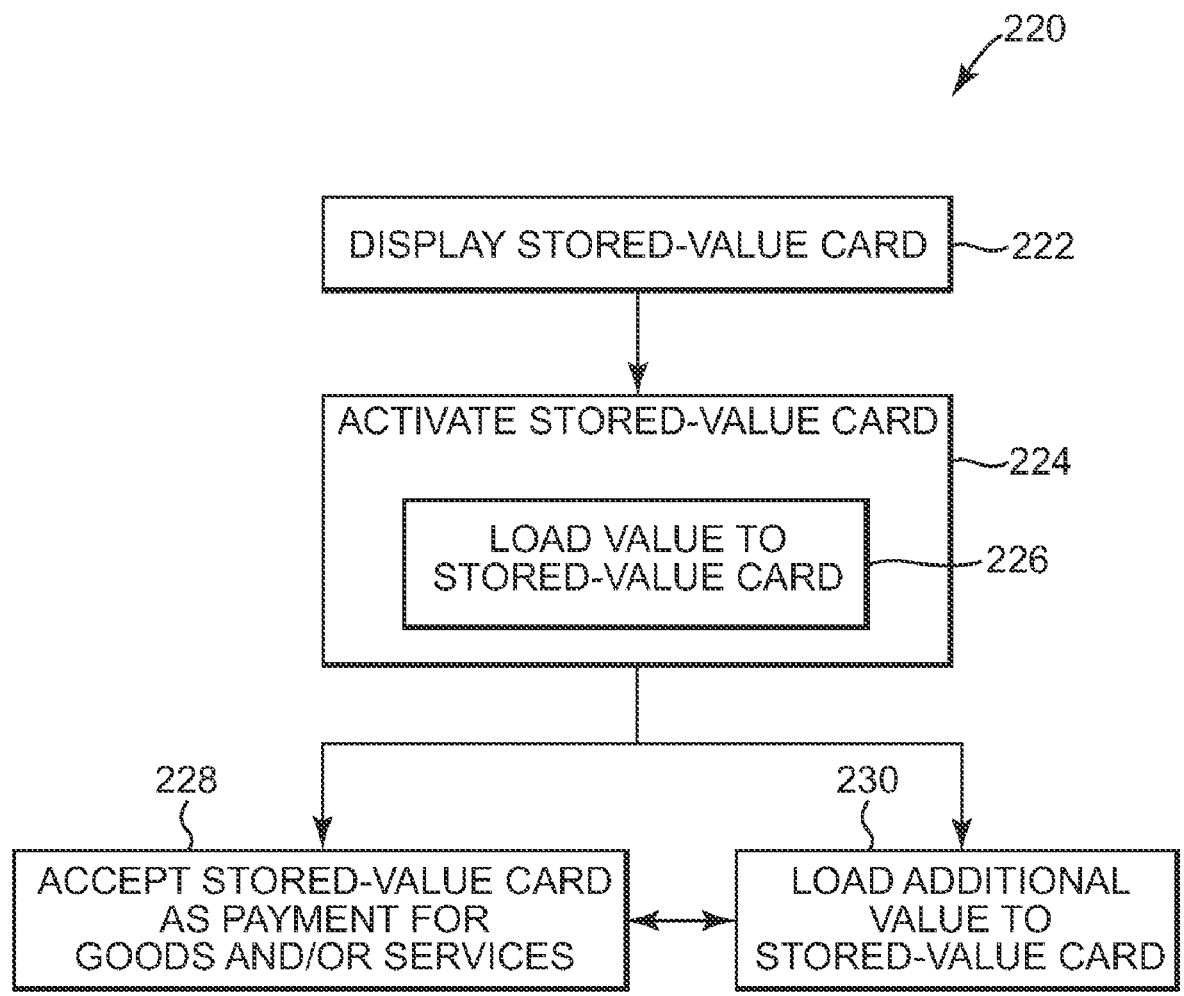
FIG. 13 is a flow chart illustrating a method of encouraging purchase and facilitating use of a stored-value card, according to one embodiment the present invention.

FIG. 13 is a flow chart illustrating one embodiment of a method 220 of encouraging purchase and facilitating use of stored-value card 10 by consumers and/or recipients. At 222, stored-value card 10 is placed on or hung from a rack, shelf, or other similar device to display stored-value card 10 for sale to potential consumers. For example, additionally referring to FIGS. 10 and 11, outside surfaces 122 of backer 100 may be folded about fold line 116 toward one another and stored-value card assembly 104 placed on a display rack such that stored-value card 10 is readily visible to potential consumers. In one embodiment, a depiction of stored-value card 10 is placed on a web site for viewing and purchase by potential consumers.

At 224, a consumer who has decided to purchase stored-value card 10 presents stored-value card 10 on backer 100 to a retail store employee, retail store kiosk, remote terminal, or other person or device to scan account identifier 30 to access an account or record linked to account identifier 30. In particular, account identifier 30 is scanned or otherwise accessed, for example through opening 114 of backer 100 to activate stored-value card 10. Upon accessing the account or record, then, at 226, value is added to the account or record in the form of monetary value, points, minutes, etc. Thus, stored-value card 10 is activated and loaded.

Once stored-value card 10 is activated and loaded, stored-value card 10 can be used by the consumer or any other bearer of stored-value card 10 to purchase goods and/or services at the affiliated retail setting (e.g., a retail store or web site) or can be used in exchange for calling minutes, etc. In one embodiment, where stored-value card 10 is displayed on a web site at 222, then, at 224, stored-value card 10 may be activated in any suitable method and may not require the physical scanning of account identifier 30 to be activated or to otherwise access the associated account or record such as at 226.

In one example, at 228, the retail store or other affiliated retail setting or web site accepts stored-value card 10 as payment towards the purchase of goods and/or services made by the current bearer of stored-value card 10. In particular, the value currently loaded on stored-value card 10 (i.e., stored or recorded in the account or record linked to account identifier 30) is applied toward the purchase of goods and/or services. At 230, additional value is optionally loaded on stored-value card 10 at a point-of-sale terminal, kiosk, or other area of the retail store or related setting. Upon accepting stored-value card 10 as payment at 228, the retail store or related setting can subsequently perform either operation 228 or operation 230 as requested by a current bearer of stored-value card 10. Similarly, upon loading additional value on stored-value card 10 at 230, the retail store or related setting can subsequently perform either operation 230 again or operation 228. In one example, the ability to accept stored-value card 10 as payments for goods and/or services is limited by whether the account or record associated with stored-value card 10 has any value stored or recorded therein at the time of attempted redemption.

FIG. 14 is a flow chart illustrating one embodiment of a method 250 of using stored-value card 10 (e.g., FIGS. 1-8). At 252, a potential consumer of stored-value card 10, which is displayed in a retail store or viewed on a web site, decides to and does purchase stored-value card 10 from the retail store or web site. It should be understood that stored-value card 10 can be displayed and purchased alone or as part of stored-value card assembly 104 (FIG. 11) along with backer 100. Upon purchasing stored-value card 10, a retail store employee, a retail store kiosk, or other person or device scans account identifier 30 (FIGS. 3 and 11) through opening 114 of backer 100 or otherwise reads or accesses account identifier 30. Upon accessing account identifier 30, the account or record linked to account identifier 30 is accessed and activated to load value onto stored-value card 10 (i.e., load value to the account or record associated with stored-value card 10). In one embodiment, such as where stored-value card 10 is purchased at 252 via a web site, actual scanning or other mechanical detection of account identifier 30 may be eliminated.

At 254, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 254.

At 256, the consumer or recipient redeems stored-value card 10 for goods and/or services from the retail store or web site. At 258, the consumer or recipient of stored-value card 10 optionally adds value to stored-value card 10, more particularly, to the account or record associated with account identifier 30 included therewith, at the retail store or over the Internet (i.e., via the web site). Upon redeeming stored-value card 10 at 256 or adding value to stored-value card 10 at 258, the consumer or recipient of stored-value card 10 subsequently can perform either of operations 256 or 258 as desired. In one embodiment, the ability of the consumer or recipient to repeat redeeming stored-value card 10 at 256 is limited by whether the account or record linked with stored-value card 10 has any remaining value stored or recorded therein at the time of attempted redemption.

Although described above as occurring at a single retail store or web site, in one embodiment, purchasing stored-value card 10 at 252, redeeming stored-value card 10 at 256, and adding value to stored-value card 10 at 258, can each be performed at any one of a number of stores adapted to accept stored-value card 10 or over the Internet. In one example, a number of stores are each part of a chain or are similarly branded stores. In one example, a number of stores include at least one web site and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or a third party. The term "loading on" or "loaded on" herein should be interpreted to include adding to the balance of an account or record associated with a stored-value card. The balance associated with the stored-value card declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, calling cards, employee cards, frequency cards, prepaid cards, and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction card comprising:
    a substrate including an account identifier linking the transaction card to at least one of an account and a record, the account identifier being machine readable by a point-of-sale terminal;
    a plurality of adhesive dots applied to a surface of the substrate; and
    a plurality of beads each being individually secured to the surface of the substrate with a separate one of the plurality of adhesive dots.

2. The transaction card of claim 1, wherein the account identifier includes a bar code.

3. The transaction card of claim 1, wherein the account identifier includes at least one of a bar code, an electronic device, and a radio frequency identification (RFID) device.

4. The transaction card of claim 1, wherein each of the plurality of beads has a diameter of greater than about 0.5 mm.

5. The transaction card of claim 1, wherein each of the plurality of beads is one of transparent and translucent.

6. The transaction card of claim 5, wherein the plurality of beads are secured to the surface in clusters over corresponding object indicia on the surface of the substrate such that the corresponding object indicia are viewable through the clusters of the plurality of beads, and the plurality of beads at least one of diffuse and magnify the corresponding object indicia.

7. The transaction card of claim 1, wherein each of the plurality of beads is formed of glass.

8. The transaction card of claim 1, wherein the plurality of beads are secured to the surface in clusters corresponding with object indicia on the surface of the substrate such that the object indicia are viewable through the clusters of the plurality of beads.

9. The transaction card of claim 1, wherein the plurality of beads are secured to the surface in a plurality of clusters spaced from one another on the surface.

10. The transaction card of claim 9, wherein each one of the plurality of beads in a first cluster of the clusters directly abuts another of the plurality of beads in the first cluster.

11. The transaction card of claim 1, wherein the plurality of beads are secured to the surface of the substrate in a single layer.

12. The transaction card of claim 1, wherein the adhesive dots are formed of an adhesive material that is one of transparent and translucent when cured.

13. The transaction card of claim 1, wherein the surface is a first surface, and the account identifier is included on a second surface of the substrate opposite the first surface.

14. The transaction card of claim 1, in combination with a backer selectively coupled with and configured to support the substrate.

15. The combination of claim 14, wherein the backer defines a window, wherein the substrate is coupled to the backer such that the account identifier of the transaction card is viewable through the window of the backer.

16. A stored-value card comprising:
    a substantially planar member;
    a plurality of separate, individual means for viewing a surface of the substantially planar member therethrough, wherein the plurality of separate, individual means for viewing are each coupled with the surface of the substantially planar member, and wherein the plurality of separate, individual means for viewing include means for providing three-dimensional relief to the surface of the substantially planar member; and
    means for linking the stored-value card to a stored-value account or record.

17. The stored-value card of claim 16, wherein each of the plurality of separate, individual means for viewing is individually adhered to the surface of the substantially planar member.

18. The stored-value card of claim 16, wherein each of the plurality of separate, individual means for viewing is a three-dimensional object.

19. A method of providing a financial transaction card, the method comprising:
    printing decorative indicia to a first surface of a substrate;
    applying adhesive in a spot printing process to portions of the first surface of the substrate over the decorative indicia;
    securing each of a plurality of three-dimensional objects to the spot printed adhesive, wherein each of the three-dimensional objects is one of translucent and transparent; and
    curing the adhesive;
    wherein applying adhesive in a spot printing process forms a plurality of discrete spots of adhesive, and wherein securing each of the plurality of three-dimensional objects to the spot printed adhesive includes securing each of the plurality of three-dimensional object to a different one the plurality of discrete spots of adhesive.

20. The method of claim 19, wherein each of the plurality of three-dimensional objects defines a diameter of greater than about 0.5 mm.

21. The method of claim 19, wherein curing the adhesive is performed after applying adhesive in the spot printing process and securing each of the plurality of three-dimensional objects to the spot printed adhesive, and wherein curing the adhesive includes heating the substrate, the adhesive, and the plurality of three-dimensional objects at a temperature of less than about 75° C. for a time period of greater than about 15 minutes.

* * * * *